(12) United States Patent
Rice

(10) Patent No.: US 6,621,900 B1
(45) Date of Patent: *Sep. 16, 2003

(54) AUTOMATED RIGHT-PARTY CONTACT TELEPHONE SYSTEM

(76) Inventor: Blake Rice, 6225 County Rd. 30, Waconia, MN (US) 55387

( * ) Notice: Subject to any disclaimer, the term of this patent is extended or adjusted under 35 U.S.C. 154(b) by 0 days.

This patent is subject to a terminal disclaimer.

(21) Appl. No.: 09/416,299

(22) Filed: Oct. 12, 1999

Related U.S. Application Data

(63) Continuation-in-part of application No. 09/170,501, filed on Oct. 13, 1998, now abandoned, which is a continuation-in-part of application No. 09/069,428, filed on Apr. 29, 1998, now abandoned, which is a continuation-in-part of application No. 08/994,110, filed on Dec. 19, 1997, now abandoned.

(51) Int. Cl.[7] .............................. H04M 3/00; H04M 5/00
(52) U.S. Cl. ............................... 379/266.07; 379/265.11
(58) Field of Search ........................ 379/265.01–265.14, 379/266.01–266.1, 309

(56) References Cited

U.S. PATENT DOCUMENTS

| | | | | | |
|---|---|---|---|---|---|
| 5,008,930 A | * | 4/1991 | Gawrys et al. | ............. | 379/210 |
| 5,299,259 A | * | 3/1994 | Otto | ...................... | 379/112.01 |
| 5,309,513 A | * | 5/1994 | Rose | .......................... | 379/265 |
| 5,335,268 A | * | 8/1994 | Kelly, Jr. et al. | ............ | 379/265 |
| 5,335,269 A | * | 8/1994 | Steinlicht | ..................... | 379/265 |
| 5,392,346 A | * | 2/1995 | Hassler et al. | .............. | 379/265 |
| 5,436,965 A | * | 7/1995 | Grossman et al. | ..... | 379/112.01 |
| 5,440,623 A | * | 8/1995 | Moore et al. | ................. | 379/265 |
| 5,563,937 A | * | 10/1996 | Bruno et al. | ................. | 379/265 |
| 5,590,188 A | * | 12/1996 | Crockett | ..................... | 379/265 |
| 5,592,542 A | * | 1/1997 | Honda et al. | ............... | 379/265 |
| 5,825,869 A | * | 10/1998 | Brooks et al. | .............. | 379/265 |
| 5,923,745 A | * | 7/1999 | Hurd | .......................... | 379/265 |
| 5,991,395 A | * | 11/1999 | Miloslavsky | ........... | 379/265.02 |
| 6,285,752 B1 | * | 9/2001 | Rice | ...................... | 379/265.11 |

* cited by examiner

Primary Examiner—Benny Tieu
(74) Attorney, Agent, or Firm—Merchant & Gould P.C.

(57) ABSTRACT

A system is provided for routing telephone calls between at least first and second groups of call-handling stations. A dialer is configured to automatically place telephone calls. Once the call is placed, the dialer routes the call to a first-level hunt group. The first-level hunt group searches for an available first-level call-handling station and routes the call to the available first-level call-handling station. Once the first-level call-handling station establishes contact with the right-party, the first-level call-handling station sends a routing signal to the dialer. The dialer then routes the call to a second-level hunt group, which searches for an available second-level call-handling station. Then the second-level hunt group routes the call to the available second-level call-handling station. The first and second-level call-handling station may be at locations separate from each other.

11 Claims, 7 Drawing Sheets

AUTOMATED RIGHT-PARTY CONTACT TELEPHONE SYSTEM

REFERENCE TO CO-PENDING APPLICATIONS

The present application is a continuation-in-part of U.S. patent application Ser. No. 09/170,501, filed on Oct. 13, 1998, ABN and entitled AUTOMATED RIGHT-PARTY CONTACT TELEPHONE SYSTEM, which is a continuation-in-part of U.S. patent application Ser. No. 09/069,428, ABN filed on Apr. 29, 1998, and entitled AUTOMATED RIGHT-PARTY CONTACT TELEPHONE SYSTEM, which is a continuation-in-part of U.S. patent application Ser. No. 08/994,110, ABN filed on Dec. 19, 1997, and entitled AUTOMATED RIGHT-PARTY CONTACT TELEPHONE SYSTEM, the disclosures of which are hereby incorporated by reference.

TECHNICAL FIELD

This invention relates to telephone systems, and more particularly, to automated telephone systems and predictive dialers for establishing right-party contact.

BACKGROUND

The global marketplace is becoming more open and more efficient at providing goods and services. In the collection and tele-marketing industries, firms use a call-handling station as the crucial link between the firms and the person being contacted (right-party). Typically these firms use call-handling stations to place outbound calls, receive inbound calls, ask for right parties, leave messages, return calls, and conduct business with the right parties. The call-handling stations are segregated into groups, groups are assigned to handle specific call types arriving or leaving on telephone trunk lines, and trunk lines are designated for particular purposes such as support, sales, and collections.

One significant disadvantage of these existing call-center environments is that as few as ten percent of the calls result in contact with the right-party. Thus, the person manning the call-handling station spends most of his/her time trying to reach the right-party rather than conducting business with the right-party. As a result, the calling system requires a large staff to handle a significant volume of calls. A related problem is that the system requires call-handling equipment for each call-handler. The result is high overhead for wages, benefits, training, equipment, and the like.

Therefore, there is a need for a call-center environment that increases efficiency and reduces costs to the firms. There is also a related need for a telephone system that reduces the amount of time that call-handlers spend handling calls. There is yet another need for a way to track the efficiency and productivity of the call-handlers. Increasing call-handling efficiency and productivity would result in lower personnel and facility costs to the firms.

SUMMARY

A system is provided for routing telephone calls between first and second groups of call-handling stations. The system includes a dialer, a first hunt group and a second hunt group. The dialer is configured to place telephone calls. The first hunt group is configured and arranged to route a telephone call placed by the dialer to a call-handling station within the first group of call-handling stations. The second hunt group is configured and arranged to route the telephone call placed by the dialer to a call-handling station within the second group of call-handling stations upon receiving a call routing signal from the first group of call-handling stations.

According to another embodiment, a system is provided for routing telephone calls between call-handling stations. The system includes a dialer and a second hunt group. The dialer is configured and arranged to place telephone calls and transfer calls to a first hunt group. The dialer is responsive to routing signals received from a first call-handling station. The second hunt group is configured and arranged to route the telephone call placed by the dialer to a second call-handling station upon receiving a call routing signal from the first call-handling station.

According to another embodiment, a method is provided for routing telephone calls between first and second groups of call-handling stations. The method includes placing telephone calls; routing the telephone calls to a call-handling station within the first group of call-handling stations; and routing the telephone call to a call-handling station within the second group of call-handling stations upon receiving a call routing signal from the first group of call-handling stations.

According to another embodiment, a method is provided for routing telephone calls between a first-level call-handing station and a second-level call-handling station. The second-level call-handling station is selected from a plurality of second-level call-handling stations. The method includes routing the telephone call to the first-level call-handling station; selecting a criterion; matching a second-level call handling station and the selected criterion; and routing the telephone call to the matched second-level call-handling station.

Yet another possible embodiment of the present invention is directed to a method of operating a system for routing telephone calls between first and second groups of call-handling stations. The method comprises activating a predetermined number of call-handling stations in the first group; activating a predetermined number of call-handling stations in the second group; determining the relative number of first call-handling stations from a first equation:

(DIAL*CONNECT)/1ST LEV_CALLAVE=1ST_LEV_HOURS, wherein DIAL represents a number of calls per hour placed by a predictive dialer; CONNECT represents a connect rate for the calls placed by the predictive dialer; and 1ST_ LEV_HOURS represent an average number of calls handled per hours by one first call-handling station; and determining the relative number of second call-handling stations from a second equation:

(DIAL*CONNECT*R_CONNECT)/2D_LEV_CALLAVE=2D_ LEV_HOURS, wherein 2D_LEV_HOURS represents a right-party connect rate; and 2D_LEV_HOURS represents an average number of calls handled per hour by one second call-handling station.

Other embodiments of the present invention can include any of the various aspects of the apparatuses, systems, and methods as described herein.

DETAILED DESCRIPTION

Figure 1:
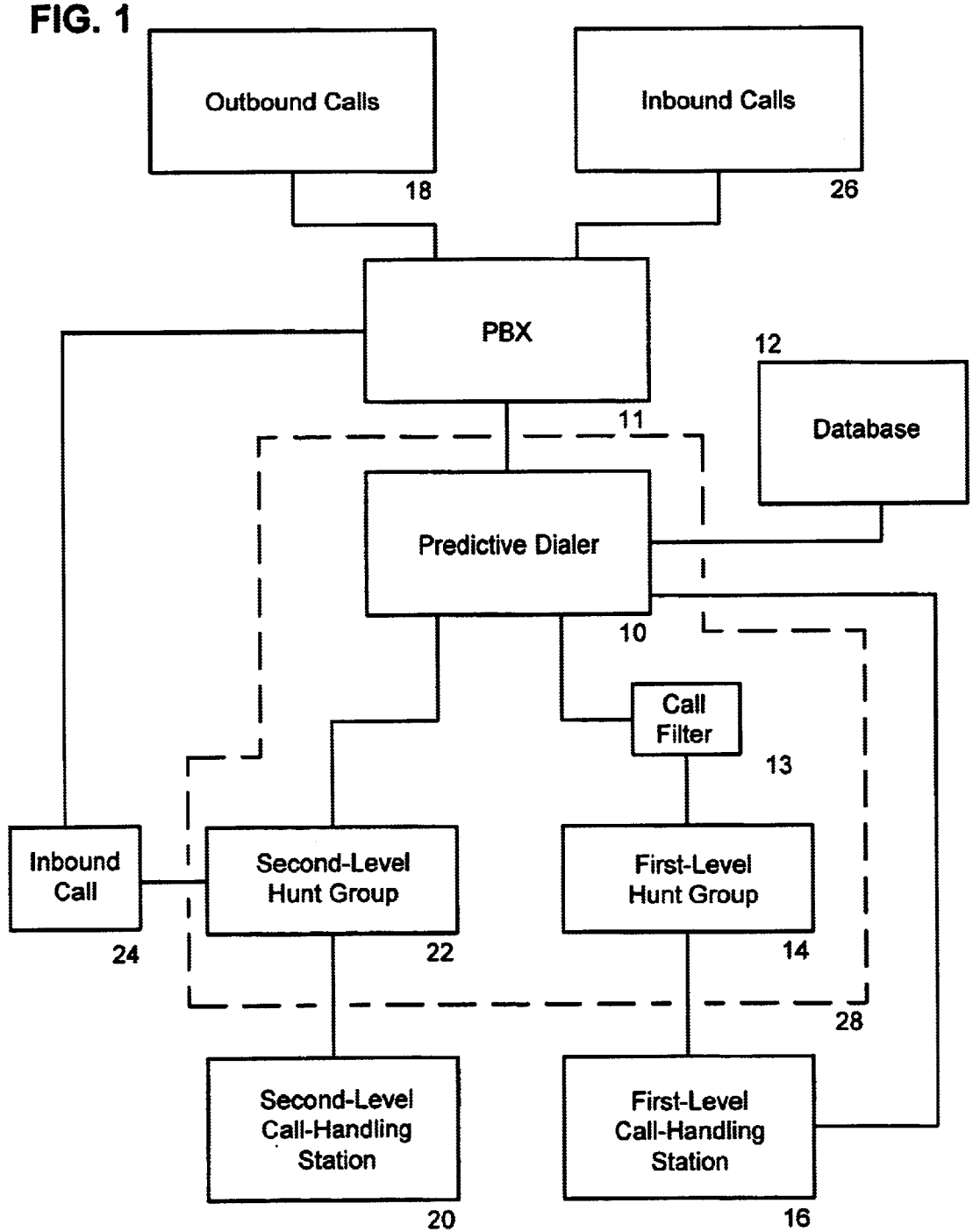
FIG. 1 is a block diagram of a multi-level telephone system.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

In general, the present invention is directed to the use of hunt groups to search for available call-handling stations in an automated right-party contact telephone system. Call control in the telephone system is routed to at least one first-level hunt group, which searches for an available first-level call-handling station. Upon confirming that the right-party is on the telephone line, the first-level call-handling station sends a routing signal, causing the call control to be routed to at least one second-level hunt group, which searches for an available second-level call-handling station. The second-level hunt group routes both the call and data to the available second-level call-handling station with minimal interaction between the first-level call-handling station and the second-level call-handling station.

This automated right-party contact telephone system has several advantages over existing call-center environments. The automated system allows lower-skilled call-handlers to screen and establish right-party contact, which in turn allows the higher-skilled call-handlers to conduct business with the right-party contact. Since the automated system searches for available call-handlers and automatically routes calls, significant call-handler time is saved, resulting in higher efficiency and productivity. As a result, the system has smaller staffing requirements and hence smaller equipment requirements. A related advantage is that the system reduces the amount of overhead required to operate the call-handling facility. Furthermore, the call-handling facility can be more selective in hiring its skilled workers and has reduced training requirements.

Referring now to FIG. 1, a multi-level telephone system has a PBX 11 that can be PC-based. A predictive dialer 10, that can also be PC-based, is in electrical communication with the PBX 11, a call filter 13, and at least one second-level hunt group 22. At least one first-level hunt group 14 is in electrical communication with the call filter 13. In an alternative embodiment, there are a plurality of first-level hunt groups 14. Each first level hunt group 14 is in electrical communication with the call filter 13. In yet another possible embodiment, there are a plurality of second-level hunt groups 22. Each second-level hunt group 22 is in electrical communication with the predictive dialer 10. In yet another possible embodiment, the multi-level telephone system does not have a call filter 13. In this embodiment, the first-level hunt group 14 is in electrical communication with the predictive dialer 10.

In one example embodiment, the predictive dialer 10, call filter 13, first-level hunt group 14, and second-level hunt group 22 are integrated into a single dialing unit as shown by the dashed box 28. In this embodiment, the dialing unit 28 can be PC-based and software driven. The PBX 11 could also be integrated into the unitary dialing unit 28. In another example embodiment, the predictive dialer 10 and the PBX 11 are integrated into a single dialing unit. In another example embodiment, the PBX 11, predictive dialer 10, call filter 13, first-level hunt group 14, and second-level hunt group 22 are separate units. In yet another example embodiment, the PBX 11, predictive dialer 10, call filter 13, first-level hunt group 14, and second-level hunt group 22 are integrated into different combinations of equipment. For example, the PBX 11 and the second-level hunt group 22 may be integrated into a single unit, or the predictive dialer 10 and the first-level hunt group 14 may be integrated into a single unit. Any one of these combinations of equipment forms a dialer.

A database 12 is in electrical communication with the predictive dialer 10. The database 12 could also be integrated into the unitary dialing unit 28. The database 12 contains information such as the right-party contact's name, address, telephone number, and account information. At least one first-level call handling station is in electrical communication with each first-level hunt group 14. At least one second-level call-handling station 20 is in electrical communication with each second-level hunt group 22. Additionally, each second-level hunt group 22 is in electrical communication with the PBX 11.

In an example embodiment, the electrical communication between the dialing unit 28, including the predictive dialer 10, call filter 13, first-level hunt group 14, and second-level hunt group 22; first-level call-handling station 16; and second-level call-handling station 20 include, two links for electrical communication. One link, and its related drivers and other electronics, is configured for transmitting either analog or digital voice information. The other link, and associated drivers and other electronics, is configured for data transmission, including control signals and information to and from the database 12. In an alternative embodiment, both voice and data communication are transmitted over a single link. In another alternative embodiment, either voice or data communication are transmitted over a single link.

The first- and second-level call-handling stations 16 and 20 are computers or dumb terminals equipped with integrated telephonic features. This system can have either a headset or a handset interfaced with the computer for voice communication. An advantage of this system is that the person or call-handler manning the call-handling station can manage the telephone calls and information from the database 12. In one possible embodiment, call handling stations are of the type included in the SmartDial predictive dialing system, which is manufactured by Information Access Technologies, Inc. of Salt Lake City, Utah. An alternative embodiment simply has a computer and separate telephone. The person manning the call-handling station uses the telephone for voice communication and the computer to manage the database information. Yet another possible embodiment has a videophone with a computer. This embodiment allows the call-handler to not only manage the database information and communicate by voice, but also to interactively view the right-party contact.

The first- and second-level call-handling stations 16 and 20 are typically manned by people or call-handlers. When the call-handler at the first-level call-handling station 16 is available to take a call placed by the predictive dialer 10, he/she sets a flag that is communicated to the first-level hunt group 14. The first-level hunt group 14 receives the flags and places the flags in a queue. Similarly, when the call-handler at the second-level call-handling station 20 is ready to receive a call, he/she sets a flag that is communicated to the second-level hunt group 22, which receives the flags and places the flags in a queue.

The predictive dialer 10 retrieves telephone numbers and corresponding account information from the database 12 and automatically dials the telephone number through the PBX 11. When the predictive dialer 10 makes a connection with the telephone number dialed, the predictive dialer 10 routes the call and corresponding account information from the database 12 in a coordinated transmission through the call filter 13 to the first-level hunt group 14. In this manner, the voice information and the database information are communicated to the first-level call-handling station 16 at the same time.

The call filter 13 electronically screens calls being routed to the first-level hunt group 14. When a call is connected, the call filter 13 determines whether the information being received is from a natural person; an answering machine; or data from a fax machine, operator message, or the like. If the information received during the call is from a natural voice, the call filter 13 permits the call to be routed to the first-level hunt group 14. If the information is from an answering machine, an automated message can be left on the machine to have the right-party call the multi-level call station. If data is received from the called number, the call is terminated.

The first-level hunt group 14 searches for a flag of an available first-level call-handling station 16. When an available flag is found, the first-level hunt group 14 routes the call to the available first-level call-handling station 16. The call-handler at the first-level call-handling station 16 is responsible for establishing right-party contact at the connected telephone number, skip tracing, data corrections, and leaving messages. The call-handler can then update the database with notes on the conversation, updated telephone numbers, updated addresses, and the like.

The call-handler at the first-level call-handling station 16 will ask the party who answered the telephone if the right party is available. If the right party is not available, the first-level call-handling station 16 discontinues the call. The person at the first-level call-handling station 16 then resets its available flag so that it can take another call. The available flag is set by entering a code on the computer, pressing a function key on the computer, or pressing a control button on the telephone.

If the right-party is available, the first-level call-handling station 16 sends a routing signal to the predictive dialer 10. The predictive dialer 10 then routes the call and data corresponding to the caller's account information, the call, or the data corresponding to the account information. If the second-level hunt group 22 receives only the call, the predictive dialer routes the data to the second-level hunt group 22 at a later time. Alternatively, the second-level call-handling station 20 can manually access the data. Similarly, if the second-level hunt group 22 receives only the data, the predictive dialer routes the call to the second-level hunt group 22 at a later time. Alternatively, the second-level call-handling station 20 can manually connect to the call. Preferably, the predictive dialer 10 routes the call and the corresponding data to the second-level hunt group 22 in a coordinated manner. The second-level hunt group 22 searches for a flag of an available second-level call-handling station 20.

When an available flag is found, the second-level hunt group 22 routes the call and corresponding account information in a coordinated transmission to the available second-level call-handling station 20. The call and corresponding account information is then released from the first-level call-handling station 16, via a release signal from the second-level call-handling station, and the second-level call-handling station 20 communicates with the right-party. In one possible embodiment, furthermore, this coordinated transmission is conducted without the second-level call-handling station 20 choosing to accept the call. The call and data are automatically transmitted to an available second-level call-handling station without any required interaction on the part of the person operating the second-level call handling station or without any interaction between the first-level call-handling station 16 and the second-level call-handling station 20.

The call and corresponding account information is then released from the first-level call-handling station 16, and the second-level call-handling station 20 communicates with the right-party.

When the communication is completed, the call is terminated, and the person at the second-level call-handling station 20 resets its available flag so that it can take another call. The call-handler at the second-level call-handling station 20 can also update the database 12 with information such as notes from the telephone conversation, payment schedules, updated telephone numbers, and the like.

In an alternative embodiment, voice conferencing is utilized. The first-level call-handling station 16 sends a routing signal to the predictive dialer 10. The predictive dialer 10 then routes the call and corresponding account information to the second-level hunt group 22. The second-level hunt group 22 searches for a flag of an available second-level call-handling station 20. When an available flag is found, the second-level hunt group 22 routes the call and corresponding account information in a coordinated transmission to the available second-level call-handling station 20. The first-level call-handling station 16 can then communicate with the second-level call-handling station 20 and the right-party simultaneously. When the first-level call-handling station 16 terminates communication, the call and corresponding account information is released from the first-level call-handling station 16, but maintained with the second-level call-handling station 20.

In yet another alternative embodiment, pre-selected routing is utilized. Right-parties meeting specific criteria are routed to a specific second-level call-handling station 20. Alternatively, where multiple second-level hunt groups 22 are utilized, right-parties meeting specific criteria are routed to a specific single second-level hunt group 22 or to multiple second-level hunt groups 22. For example, second-level call-handling stations 20 associated with a single second-level hunt group 22 may be better suited to communicate with right-parties meeting a specific criteria while second-level call-handling stations 20 associated with another second-level hunt group 22 are better suited to communication with right-parties meeting a second set of specific criteria. In this manner, right-parties are routed to the second-level hunt group 22 or multiple second-level hunt groups that have associated second-level call-handling stations 20 best able to communicate with that right-party. Some possible embodiments could also include multiple first-level hunt groups 14.

When right party contact is established, the predictive dialer 10 uses look-up tables to compare criteria or data associated with the right-party with criteria associated with specific second-level hunt groups 22. The predictive dialer 10 then routes the right-party to the specific or predetermined second-level hunt group 22 or multiple second-level hunt groups 22 that match the criteria associated with the right-party. In one possible embodiment, the predictive dialer automatically selects criteria for comparison to the look-up table. In another possible embodiment, the criteria is manually entered by an operator such as the call handlers manning the first-level call-handling station 16. In yet another possible embodiment, the specific or predetermined second-level hunt group 22 is selected manually or though means other than a look-up table. Any type of predetermined data can be manually entered or automatically selected for comparison to the look-up table for predetermined routing. Examples include telephone numbers, area codes, country codes, account numbers, names, particular data associated with an account, language spoken by the person on the connected call, and particular information that a caller provides to a first-level call-handling station 16.

As described herein, the multi-level call-handling system routes calls between various system components. For example, the first-level hunt group 14 routes calls by controlling the PBX 11 to transfer the call to one of the first-level call-handling stations 16. If right-party contact is made, the first-level call-handling station 16 passes control of the call to the second-level hunt group 22, which routes calls by controlling the PBX 11 to transfer the call to one of the second-level call-handling stations 20.

Inbound calls 26 are received through the PBX 11. The PBX 11 routes inbound calls to the second-level hunt group 22. In one possible embodiment, the integrated dialing unit 28 is programmed with a screen-pop software, which identifies the telephone number of the inbound call and retrieves account information from the database 12 that is associated with that telephone number. One such system is the Answered Call Distribution System, which is manufactured by NEC of Irving, Tex. and included within the NEC PBX's. The second-level hunt group 22 then routes the call and corresponding account information to the next available second-level call-handling station 20.

In an alternative embodiment, the PBX 11 routes the call to an inbound call receiver (not shown). The inbound call receiver may be a receptionist or an automated voice answering system. When the inbound call 26 is received, the inbound call receiver answers the telephone call and determines to whom the call should be transferred. If the inbound call receiver is a person, he/she manually transfers the call to the appropriate call-handling station or the appropriate hunt group. Alternatively, if the inbound call receiver is an automated voice answering system, the caller simply enters an extension of the call-handling station to which they wish to speak. The automated voice answering system automatically transfers the call.

The second-level call-handling station 20 also makes outbound calls 18 through the PBX 11 as needed and when not taking inbound calls. Typically, these outbound calls are return calls where a previously called party told the call-handler to call back at a certain time. The second-level call-handling station 20 dials the appropriate telephone number and asks for the right-party. When right-party contact is established, the second-level call-handling station 20 communicates with the right-party. When the communication is completed, the call is terminated, and the second-level call-handling station 20 resets its available flag.

The database 12 may be a software application that is run on a computer. The software is loaded into memory from a storage medium, such as a hard drive, and is processed by the processor. One type of software application that can be used for the predictive dialer and database is the software included in the SmartDial predictive dialing system, which is manufactured by Information Access Technologies, Inc. of Salt Lake City, Utah.

In an alternative embodiment, as explained in more detail below, individual components of the multi-level telephone system are located off-site or remotely from the main system. In one possible example, a call-handling station 16 or 20 is operated by a person from his/her home or some other remote facility. In another possible example, the call-handling stations 16 or 20 are operated by people in a foreign country. In another possible example, the predicative dialer 10 or the integrated dialing unit 28 are located in one country while the second-level call-handling stations 20 are located in another country. When one of the call-handling stations 16 or 20 are located in a remote location, the call handling stations 16 and 20 communicate with the integrated dialing unit 28 via modems and telephone lines or any other suitable means for electrical communication. Other suitable means for electrical communication include communication over the Internet, via radio, or via satellites.

These alternative embodiments are advantageous because a smaller facility can be utilized. Furthermore, a firm can provide flexibility to its employees and can also take advantage of lower labor costs in a different locale. These advantages further reduce operating costs for the firm.

In yet another possible embodiment, the integrated dialing unit 28 is loaded with software that can track statistical usage of the system. For example, the software includes a plurality of timers for tracking information such as the duration of each call, the duration of the interval between each call, the number of calls made by the dialer, the number of calls handled by each call-handling station, and the number of right-party contacts that are established. The software can then generate statistical reports that are useful to identify training and staffing requirements. In one possible embodiment, the software automatically logs such information upon such events as the predictive dialer 10 placing a call, the call-handling station setting an availability flag to its associated hunt group, and disconnecting a call.

Figure 2:
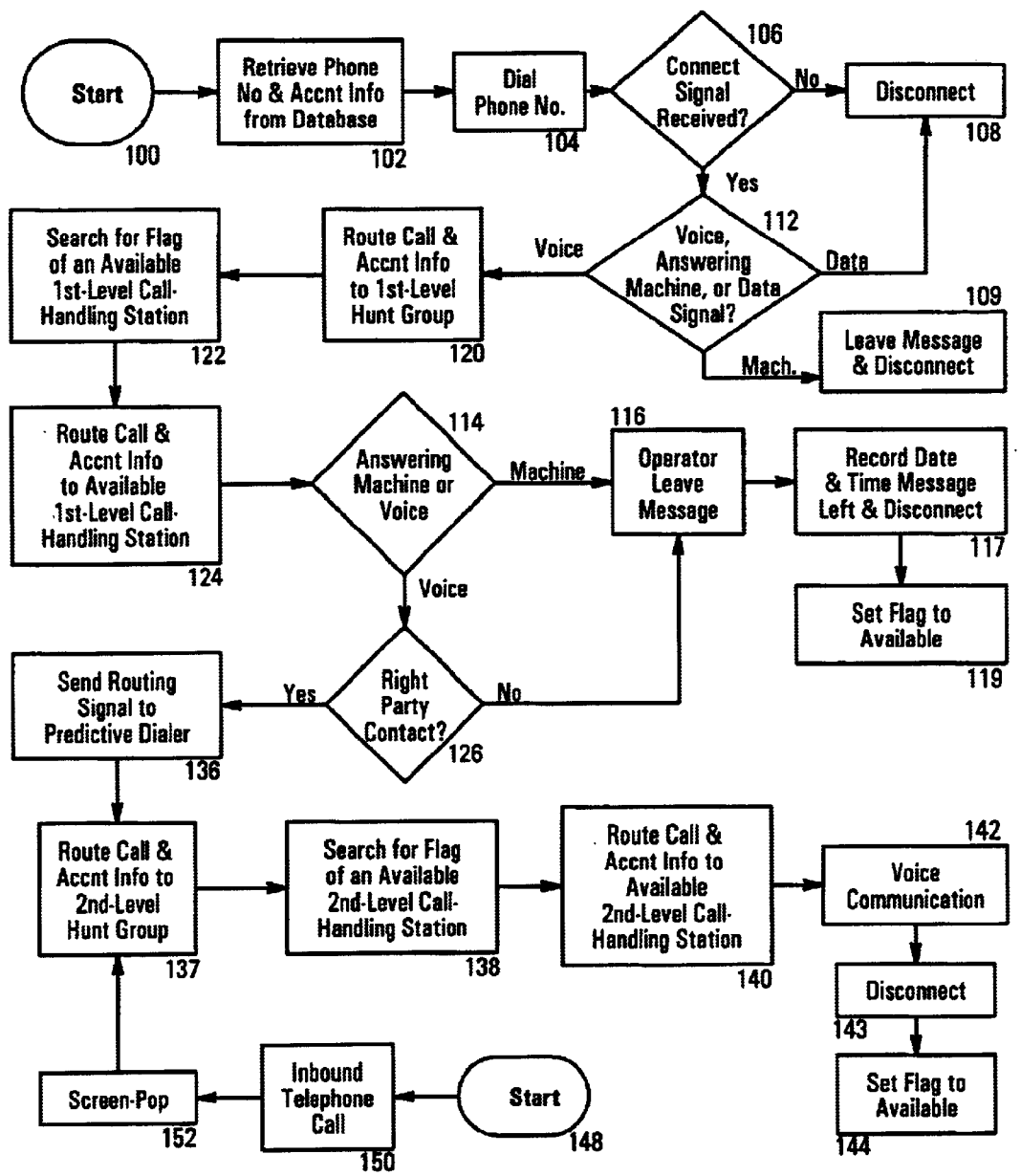
FIG. 2 is a flow chart depicting control of the calls as handled by the multi-level telephone system.

Referring now to FIG. 2, one possible embodiment of the multi-level telephone system operates according to the flow chart shown. The system begins at start block 100. At block 102, the predictive dialer 10 retrieves a telephone number and corresponding account information from the database 12. The predictive dialer 10 dials the telephone number at block 104. At block 106, the predictive dialer 10 determines whether a connect signal has been received. If not, program control is transferred to block 108 and the call is disconnected. Returning to block 106, if a connect signal is received, the call filter 13 determines at block 112 whether the signal is a voice signal, answering machine, or data signal. Generally, data signals are those signals transmitted and received by fax machines and computer modems. If the connect signal is a data signal, the flow of the program proceeds to block 108, and the call is disconnected. If the connect signal is an answering machine, an automated message is left and the call is disconnected at block 109.

Returning to block 112, if the call filter 13 detects a voice signal, the program proceeds to block 120 and the predictive dialer routes the call and corresponding account information to a first-level hunt group 14. The first-level hunt group 14 searches for a flag of an available first-level call-handling station 16 at block 122. When an available flag is found, the first-level hunt group 14 routes the call and corresponding account information to the available first-level call-handling station 16 at block 124.

The call filter 13 is not completely accurate at filtering out non-voice calls. Therefore, the first-level call-handling station 16 initially determines whether there is a voice, answering machine, or data at block 114. If data is detected, the call is terminated. If an answering machine is detected, flow of the program proceeds to block 116, and the first-level call-handling station 16 leaves a message on the answering machine. Alternatively, an automated message may be left. Then, the first-level call-handling station 16 records the date and time the message was left in the database 12 by pressing a function key on its computer, and the call is disconnected at block 117. Alternatively, the recordation may be done automatically by the system when the call is disconnected. The first-level call-handling station 16 resets its available flag at block 119. The available flag allows the first-level hunt group 14 at block 122 to search for an available first-level call handling station 16. If the first-level call-handling station 16 is not going to be available, the call handler does not reset the available flag, and the first-level hunt group 14 will not be able to find the first-level call-handling station 16 at block 122.

Returning to block 114, if a voice is detected, the first-level call-handling station 16 determines whether it has a right-party contact at block 126. If there is not a right-party contact, flow of the program proceeds to block 116, and the first-level call-handling station leaves a message. Then, the first-level call-handling station 16 records the date and time the message was left in the database 12 by pressing a function key on its computer, and the call is disconnected at block 117. The first-level call-handling station 16 resets its available flag at block 119.

Referring back to block 126, if right-party contact is established, the first-level call-handling station 16 sends a routing signal to the predictive dialer 10 at block 136. The predictive dialer 10 then routes the call and corresponding account information to the second-level hunt group 22 at block 137. The second-level hunt group 22 searches for a flag of an available second-level call-handling station 20 at block 138. When an available flag is found, the second-level hunt group 22 routes the call and corresponding account information to the available second-level call-handling station 20 at block 140. The second-level call-handling station 20 then communicates with the right-party at block 142. When communication is completed, the call is disconnected at block 143, and the second-level call-handling station 20 resets its available flag. Alternatively, returning to block 126, the first-level call-handling station 16 can route the call and corresponding account information directly to a second-level call-handling station 20. This direct routing occurs, typically, when the right-party requests a specific second-level call-handling station 20.

Inbound calls 26 start at block 148. The inbound call 26 is received at block 150 by the PBX 11. The integrated dialing unit 28 is programmed with a screen-pop, which identifies the telephone number of the inbound call and retrieves the account information from the database 12 that is associated with that telephone number at block 152. The PBX 11 then routes the call to the second-level hunt group 22 at block 137. The second-level hunt group 22 searches for a flag of an available second-level call-handling station 20 at block 138. When an available flag is found, the second-level hunt group 22 transfers the call and the corresponding account information to the available second-level call-handling station 20 at block 140. The second-level call-handling station 20 then communicates with the right-party at block 142. When communication is completed, the call is disconnected at block 143, and the second-level call-handling station 20 resets its available flag.

FIGS. 3–6 illustrate alternative embodiments of the multi-level telephone system described above these embodiments include a predictive dialer 10, PBX 11, a call filter 13, first- and second-level hunt groups 14 and 22, first- and second-level call-handling stations 16 and 20, call filter 13, and database 12. Also as described above, an alternative embodiment integrates the predictive dialer 10, call filter 13, and first- and second-level hunt groups 14 and 22 into a single dialing unit 28.

Figure 3:
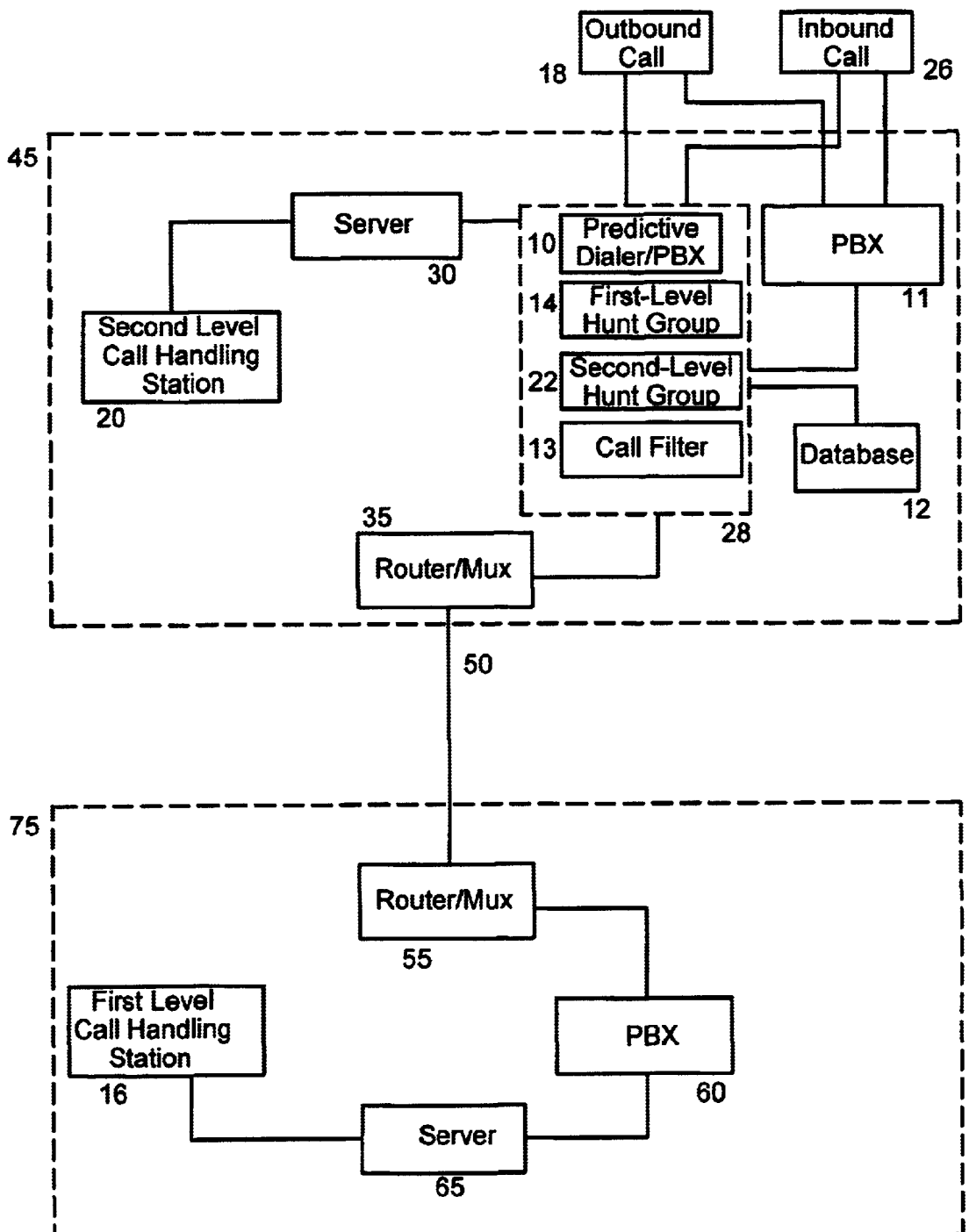
FIG. 3 is a block diagram of an alternate embodiment of the multi-level telephone system shown in FIG. 1 having multiple sites.

Referring now to the embodiment illustrated in FIG. 3, the dialing unit 28 and the second-level call handling stations 20 are located in a first location 45 and the first-level call handling stations 16 are located in a remote, second location 75. At the first location 45, a server 30 provides voice and data communication between the dialing unit 28 and the second-level call-handling station 20. A first router and multiplexer arrangement 35 is also in voice and data communication with the dialing unit 28. One alternative embodiment integrates the PBX with the predictive dialer. Still other embodiment have multiple PBXs, which increases calling capacity and also provides redundancy in case one of the PBXs fail.

At the second location 75, a server 65 provides voice and data communication between a first-level call-handling station 16 and a PBX 60. The PBX is in voice and data communication with a router and multiplexer arrangement 55. In an alternative embodiment, dial-inward direct (DID) or uniquely identified telephone lines replace the PBX 60. Yet other embodiments provide direct voice and data communication between the first-level call-handling stations 16 and the PBX 60.

In other alternative embodiments, the first-level call handling stations 16 communicate directly with the PBX 60 without the server 65, and second-level call handling stations 20 communicate directly with the dialing unit 28 without the server 30. Additionally, andy type of network or communication link can be used to provide communication between the first- and second-call-handling stations 16 and 20 and either the servers 65 or 30, respectively, or the PBX 60 and dialing unit 28, respectively. Examples include wide are networks (WAN), local area networks (LAN), the Internet, or an Intranet. Additionally, voice and data information can be communicated to and from the first- and second-level call-handling stations 16 and 20 over a variety of media including, fiber, radio, satellite, or any other suitable media.

The router and multiplexers 35 and 55 are in voice and data communication via a communication medium 50. Examples of communication media include fiber, ATM, Internet, Intranet, satellite, radio, or any other suitable medium. Additionally, the dialing unit and the first-level call-handling stations can be in voice and data communication can communicate through mechanisms and methods other than routers and multiplexers. In one embodiment, for example, routers are used without multiplexers. In another embodiment, packet switching is used in place of the routers and multiplexers.

Similar to the embodiments illustrated in FIG. 1, each hunt group 14 and 22 is formed with a table stored in memory. Both tables are a linked-list and include information such an ID for each of the related first- or second-level call-handling stations 16 and 20, to which it communicates. A telephone extension or phone number is an example of such an ID. If the telephone system includes servers 35 and 55, the tables that form the first- and second-level hunt groups 14 and 22 will also include a server ID.

There are also many possible embodiment to implement and use such a system. In one embodiment, for example, the tables for the first- and second-level hunt groups 14 and 22 contain all of the extensions for the first- and second-level call handling stations 16 and 20, respectively. When a telephone call and related data link is ready to be connected to a first- or second-level call handling station 16 and 20, the first- or second-level hunt groups 14 and 22, respectively, will dial each of the extension in the table until it finds an available first- or second-level call-handling station 16 and 20, respectively. If an operator does not respond to the call at the first- or second-level call-handling station 16 and 20, respectively, the hunt group 14 and 22, respectively, will sequence to the next first- or second-level call-handling station 16 and 20, respectively, in its list. When the call is connected, a flag is set in the table and the first- or second-level hunt groups 14 and 22 will not attempt to establish a connection with that first- or second-level call-handling station 16 and 20, respectively until after the flag is cleared.

In an alternative implementation of the first- and second-level call handling stations 16 and 20, the operators at the first- and second-level call handling stations 16 and 20 dial into the dialing unit 28 when they are available to take calls. The extensions for the first- and second-level call-handling stations 16 and 20 are then stored in the tables that form the hunt groups 14 and 22, respectively. Additionally, an available flag is associated with the stored extension and is set, which indicates that the call-handling station 16 and 20, respectively, is available to receive calls. When a call is connected to a first- or second-level call-handling station 16 and 20, the available flag for that call-handling station 16 and 20 is cleared in the first- or second-level hunt group 14 and 22, respectively. The available flag is then reset when the call is complete. In this implementation, the communication link that is established when the first- or second-level call handling station 16 and 20 dials into the dialing unit 28 is maintained even between calls that are connected from the dialing unit 28 and the call-handling station 16 and 20.

The tables described herein are only one possible way to implement the hunt groups 14 and 22. Many other possible methods and techniques for implement the hunt groups and establishing network connections between the first- and second-call-handling stations 16 and 20 are possible.

Figure 4:
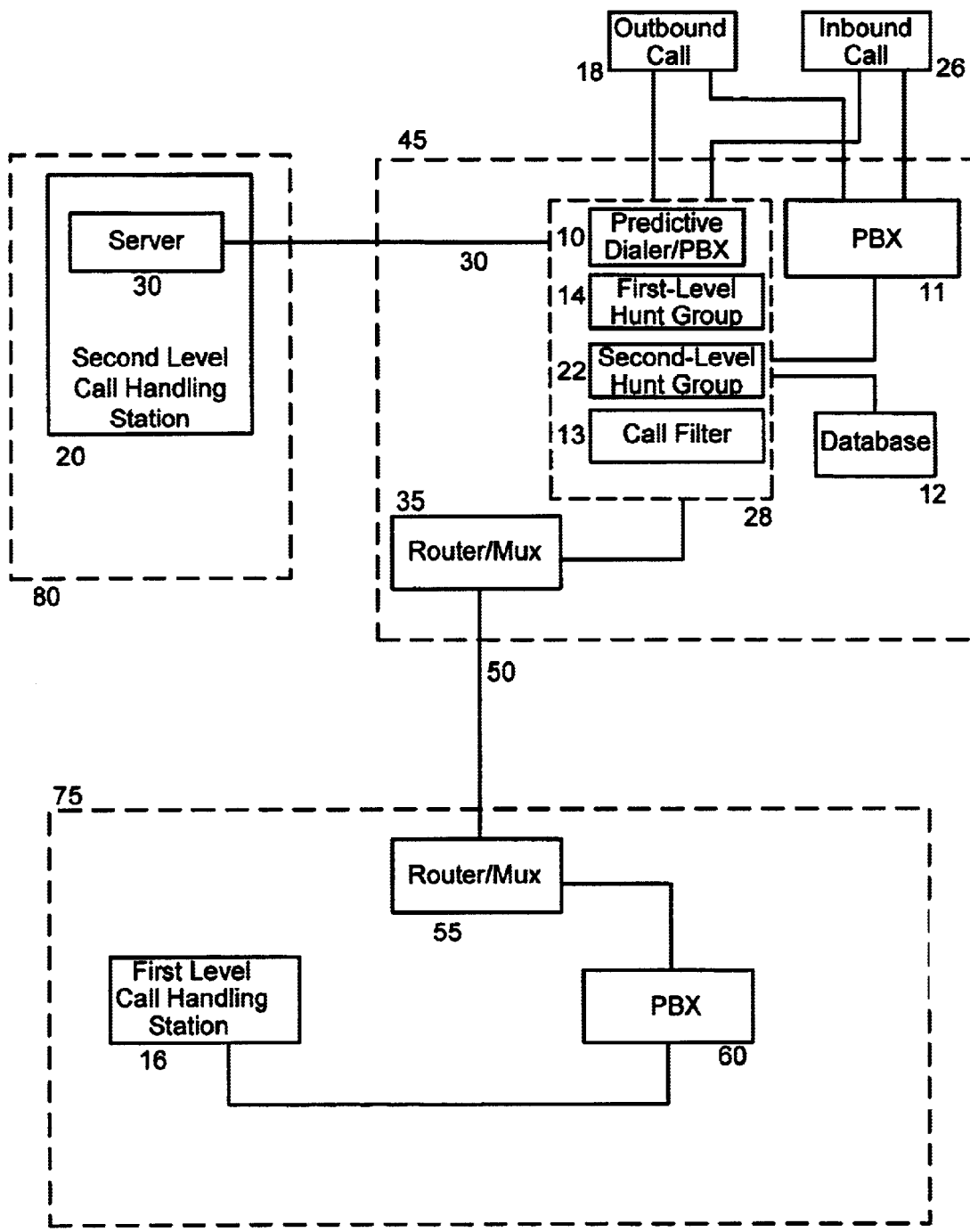
FIG. 4 is a block diagram of a second embodiment of a multiple-site, multi-level telephone system.

Referring to FIG. 4, a second embodiment of the multiple-site multi-level telephone system is substantially similar to the system illustrated in FIG. 3. The primary difference is that the second-level call-handling stations 20 and the server 30 are located remotely from the dialing unit 28, router 35, PBX 11, and database 12. Additionally, the first-level call-handling stations 16 communicate directly with the PBX 60 without the server 65.

In one implementation of this embodiment, all of the second-level call-handling stations are located at a single location 80. If all of the second-level servers are at a single location, the server can be co-located at the single location 80. Additionally, the server 30 can communicate through a PBX, router, and multiplexer similar to those used at the remote location 75 for the first-level call handling stations 16. In another implementation of this embodiment, various second-level call handling stations are located at different sites. In this scenario, the second-level call-handling stations communicate through the server 30.

Figure 5:
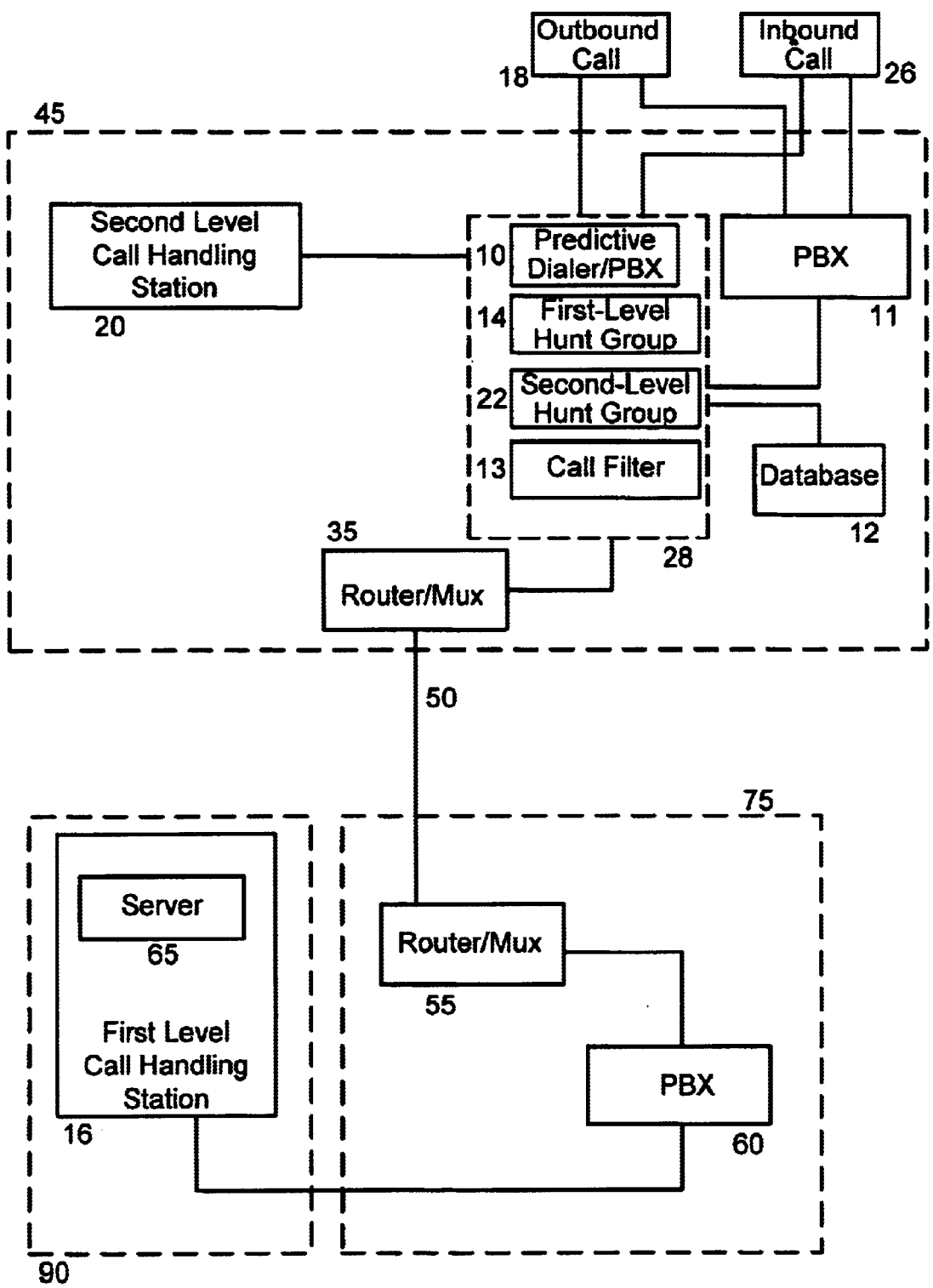
FIG. 5 is a block diagram of a third embodiment of a multiple-site, multi-level telephone system.

Referring to FIG. 5, another embodiment of the multiple-site multi-level telephone system is also substantially similar to the system illustrated in FIG. 3. The primary difference is that the first-level call-handling stations 16 and the server 65 are located remotely from the server 65, PBX 60, and router and multiplexer arrangement 55. Additionally, the second-level call-handling stations 20 communicate directly with the dialing unit 28.

In the second location 75, the router and multiplexor 55 transfer the voice and data through an optional PBX 60. The PBX may be substituted by DID or a uniquely identified telephone line. The voice and data are routed directly to the first-level call-handling station 16, which may include a server 65 for receiving the voice and data and locate at a location 90 different than the second location 75. The first-level call-handling station 16 identifies the right-party contact and sets a flag that causes the predictive dialer 10 to search through the second-level hunt group 22 for an available second-level call-handling station 20. The predictive dialer 10 transfers the right party-contact from the predictive dialer 28 directly to the second-level call-handling station 20 at the first location 45. The first-level call-handling station 16 is reset to "available," via a release signal from the second-level call-handling station 20, to receive another call. The second-level call-handling station 20 completes the communication then sets the flag to "available" to receive another call.

Figure 6:
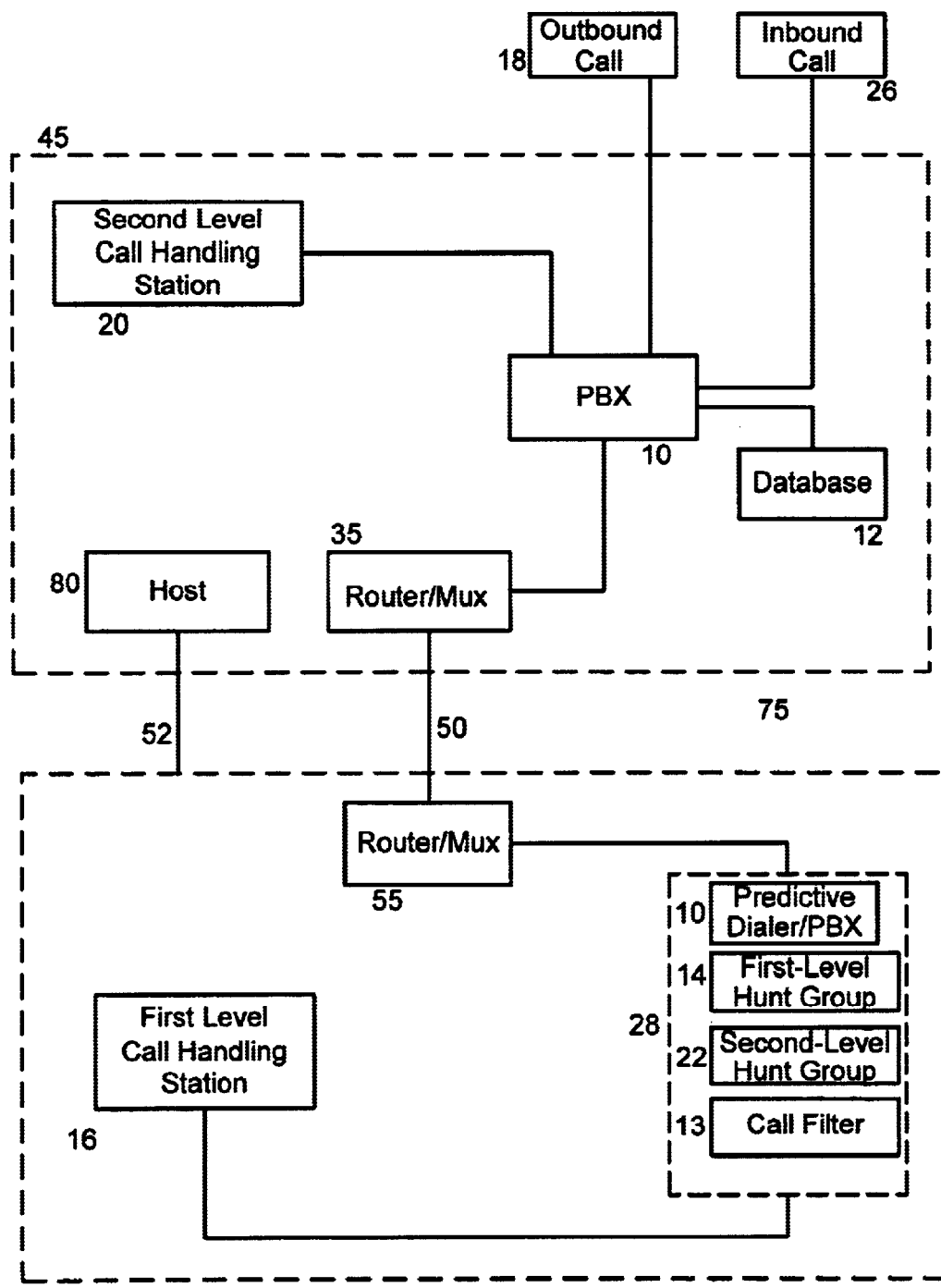
FIG. 6 is a block diagram of a fourth embodiment of a multiple-site, multi-level telephone system.

Yet another possible embodiment is illustrated in FIG. 6. Again, this embodiment is substantially similar to the embodiment illustrated in FIG. 3. However, the dialing unit is co-located at the remote site 75 and co-located with the first-level call-handling stations 16. The first-level call-handling station 16 communicates directly with the dialing unit 28. Additionally, second-level call-handling stations 20 communicates directly with the PBX 10. In turn, the PBX 10 communicated with the dialing unit through the router/multiplexer arrangements 35 and 55.

Additionally, a host 80 is provided at either the first or second locations 45 or 75 and performs system administration tasks. For example, the host can be used to enable and disable first- or second-level call-handling stations 16 or 20, update the database 12, track usage information for reporting purposes, store software configurations, make backup tapes, and the like. Examples of usage information that can be recorded includes the volume of call throughput, the rate of achieving right-party contacts, the length of calls, the length or time that a call-operating stations is manned by an operator, and the like. Additionally, such information can be recorded on a variety of different levels including individual operators, first or second levels, or system wide.

In operation, the voice and data for the right-party contact are routed directly to the first-level call-handling station 16, which resides at the second location 75 with the predictive dialer 10. The first-level call-handling station 16 identifies the right-party contact and sets a flag that causes the predictive dialer 10 to search through the second-level hunt group 22 for an available second-level call-handling station 20. This is accomplished via the router/multiplexer arrangements 35 and 50. The predictive dialer 10 transfers the right-party contact from the dialer 28 to the second-level call-handling station 20, which is at the first location 45.

Figure 7:
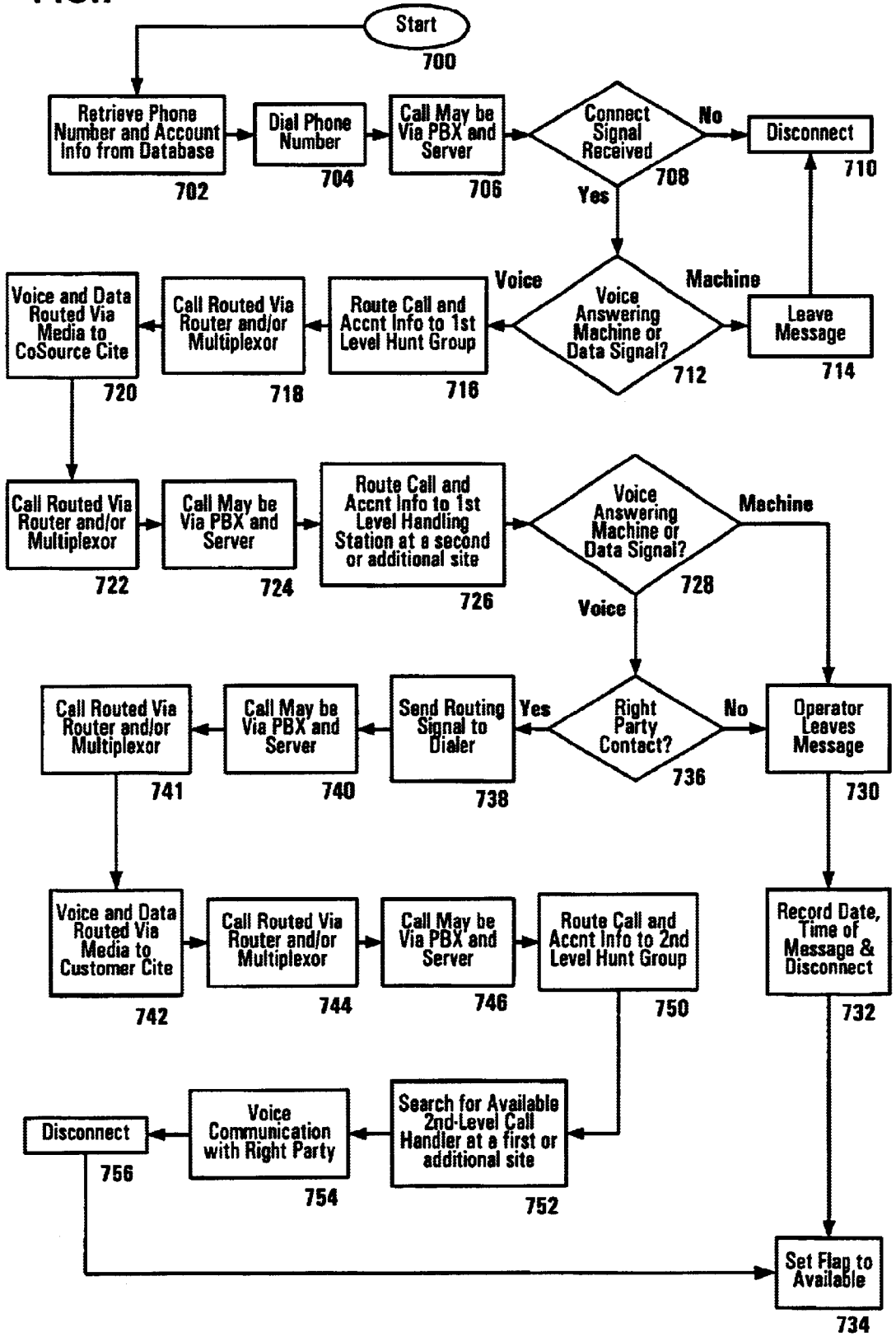
FIG. 7 is a flow chart depicting control of the calls as handled by the multiple-site, multi-level telephone systems illustrated in FIGS. 3–6.

FIG. 7 is a flow chart depicting control of the calls as handled by the multiple-site, multi-level telephone systems illustrated in FIGS. 3–6. The system begins at start block 700. At block 702, the predictive dialer 10 retrieves a telephone number and corresponding account information from the database 12. The predictive dialer 10 dials the telephone number at block 704. The call may be routed via a PBX collocated with the predictive dialer 10 and a server 30. At block 708, the predictive dialer 10 determines whether a connect signal has been received. If not, program control is transferred to block 710 and the call is disconnected. Returning to block 708, if the connect signal is received, at block 712 it is determined whether the signal is a voice signal, answering machine, or data signal. Generally, data signals are those signals transmitted and received by fax machines and computer modems. If the connect signal is a data signal, the flow of the program proceeds to block 710, and the call is disconnected. If the connect signal is an answering machine, an automated message is left 714 and the call is disconnected at block 710.

Returning to block 712, if voice signal is detected, the program proceeds to block 716 and the predictive dialer 10 routes the call and corresponding account information to a first-level hunt group 14 contained in the dialer 28. The first-level hunt group 14 searches for a flag of an available first-level call-handling station 16 at block 716. When an available flag is found, the first-level hunt group 14, contained in the dialer 28 at the first location 716, routes the call and corresponding account information. The call and corresponding account information is transferred via a first router and/or multiplexor 718 at a first location 45, over a communication medium 720, to second router and/or multiplexor 722 at a second location 75 where the available first-level call-handling station 16 is located as depicted at block 726.

The filtering out 13 of non-voice calls may not be completely accurate. Therefore, the first-level call-handling station 16 initially determines whether there is a voice, answering machine, or data at block 728. If data is detected, the call is terminated. If an answering machine is detected, flow of the program proceeds to block 730 and the first-level call-handling station 16 leaves a message on the answering machine. Alternatively, an automated message may be left. Then, the first-level call-handling station 16 records the date and time the message was left 732 in the database 12 by pressing a function key on its computer, and the call is disconnected at block 734. Alternatively, the recordation may be done automatically by the system when the call is disconnected. The first-level call-handling station 16 resets its available flag at block 734. The available flag allows the first-level hunt group 14, contained at the dialer 28, to search for an available first-level call handling station 16. If the first-level call-handling station 16 is not going to be available, the call handler does not reset the available flag, and the first-level hunt group will not be able to find the first-level call-handling station 16.

Returning to block 728, if a voice is detected, the first-level call-handling station 16 determines whether it has a right-party contact at block 736. If there is not a right-party contact, flow of the program proceeds to block 730, and the first-level call-handling station leaves a message. Then, the first-level call-handling station 16 records the date and time the message was left in the database 12 by pressing a function key on its computer, and the call is disconnected at block 732. The first-level call-handling station 16 resets its available flag at block 734.

Referring back to block 736, if right party contact is established, the first-level call-handling station 16 sends a routing signal to the predictive dialer 10 at block 738. The routing signal may be sent through a server and a PBX 740 to the second router and/or multiplexor 741. The signal is then transferred over a media 742 to the first router and/or multiplexor 744. Further, the signal may be transferred through a PBX and a server 746 to determine the availability in the second level hunt group 22. The predictive dialer 10 then routes the call and corresponding account information 750 to the second-level hunt group 22 contained in the dialer 28. The second-level hunt group 22 searches for a flag of an available second-level call-handling station 20 at block 750 at the first location 45. When an available flag is found, the second-level hunt group 22 routes the call and corresponding account information to the available second-level call-handling station 20 at block 752. The second-level call-handling station 20 then communicates with the right-party contact at block 754. When communication is completed, the call is disconnected at block 756, and the second-level call-handling station 20 resets its available flag 734.

Alternatively, returning to block 736, the first-level call-handling station 16 can route the call and corresponding account information directly to a second-level call-handling station 20. This direct routing occurs, typically, when the right-party contact requests a specific second-level call-handling station 20.

In one embodiment, the number of first- and second-level call-handling stations that need to be activated and staffed are determined by certain characteristics of the equipment and the call handlers including the number of calls placed by the predictive dialer 10, the connect rate of those calls, the right-party contact rate of the connected calls, the average number of calls handled by one first-level call-handling station 16, and the average number of calls handled by one second-level call-handling station 20.

To activate a first- or second-level call handling station 16 and 20, the call handler communicates to the system that it is available to accept telephone calls. In one possible embodiment, the call handler keys in a character string or code that logs in the call handler and communicates to the system that the call handler is available. For example, the call handler may simply key in a username and/or a password from the call-handling station at which they are working. Different logins may be used for different applications. For example, one username and password may indicate to the system that the call handler is available to take right party contacts in general. A second username and password may indicate to the system that the call handler is available to take specific types of calls. Examples of different classifications for calls include calls to debtors that are delinquent for a certain period of time, calls to debtors that are delinquent on certain accounts, calls to people in certain geographic areas, and calls to debtors that are have certain demographics.

In one possible embodiment of the exemplary configuration described above, the number of first-level call handling stations 16 that need to be activated at any given time is determined from the following equation:

$$(DIAL * CONNECT)/1ST\_LEV\_CALLAVE = 1ST\_LEV\_HOURS,$$

where DIAL is the number of dials made by the predictive dialer 10; CONNECT is the percentage of calls that are answered, excluding the number of calls managed by automation; 1ST_LEV_CALLAVE is the statistical average number of calls that a person staffing a first-level call-handling station 16 can handle in one hour; and 1ST_LEV_HOURS is the number of man hours of operation for the first-level of call-handling stations 16 needed for each hour that the installation is operating.

The necessary number of activated second-level call-handling stations 20 is determined from the following equation:

$$(DIAL * CONNECT * R\_CONNECT)/2D\_LEV\_CALLAVE = 2D\_LEV\_HOURS,$$

where R_CONNECT is the percentage of calls where the right party is available and 2D_LEV_CALLAVE is the statistical average number of calls that a person staffing a second-level call-handling station 20 can handle in one hour; and 2D_LEV_HOURS is the number of man hours of operation for the second-level of call-handling stations 20 needed for each hour that the installation is operating.

The values used for CONNECT and R_CONNECT can be determined according to industry standards or on a case-by-case basis according to factors such as the efficiency of the call handlers at a particular installation, the time of day, or demographic information. Thus, examples of factors that might affect the values for the variables CONNECT and R_CONNECT include the time of day, the day of the week, whether it is a holiday, whether the system is equipped with equipment like a call filter 13, etc. Further factors such as the delinquency of the account may further affect the value for R_CONNECT. Statistical averages can be used for CONNECT and R_CONNECT. In one possible embodiment, 32% is used for CONNECT and 23% is used for R_CONNECT.

The values used for 1ST_LEV_CALLAVE and 2D_LEV_CALLAVE will depend on a variety of factors such as the efficiency of the call handlers that are manning the first- and second-level call handling stations 16 and 20. Examples of factors that might further affect the value of 2D_LEV_CALLAVE include the time of day; whether it is a weekday, the week end, or a holiday; the delinquency of the accounts being called if the automated right-party contact telephone system is installed at a collection agency, etc.

The values of 1ST_LEV_CALLAVE and 2D_LEV_CALLAVE can be determined according to industry standards or on a case-by-case basis according to factors such as the efficiency of the call handlers at a particular installation, the time of day, or demographic information. In one possible embodiment, the value for 1ST_LEV_CALLAVE is 76 per hour and the value for 2D_LEV_CALLAVE is 20 per hour. Although the 1ST_LEV_CALLAVE can vary, most installations will try to keep the value at or above a minimum threshold such as 60, especially when initially installing a system as described herein. This minimum value for 1ST_LEV_CALLAVE ensures a minimum level of production. Furthermore, the value may increase as the call handlers at the first-level call-handling stations 16 become more efficient and handle more calls per hour.

The required ratio for activated or staffed first- and second-level call handling stations 16 and 20 is then determined by the ratio:

1ST_LEV_HOURS/2D_LEV_HOURS.

If different groups of first- and second-level call handlers are logged in to take specific types of calls, this ratio would be used to determine the number of first- and second-level call handling stations 16 and 20 to activate and staff for each group. Thus if there was two groups, the ratio and the equations would be used once for each group. If only the second-level call handlers are divided into two or more groups and each group, on average, requires a different amount of time to handle each call, then the ratio of average call lengths for each group are used to allocate the active and staffed second-level call-handling stations 20 between the groups.

EXAMPLE 1

In one example embodiment, the predictive dialer 10 dials 9942 calls per hour. The connect rate of the 9942 calls is approximately 32% or 3181 connects. One first-level call-handling station 16 can handle approximately 76 calls per hour. Therefore, utilizing the equation (DIAL*CONNECT)/1ST_LEV_CALLAVE=1ST_LEV_HOURS, the first-level call-handling stations 16 would need approximately 42 man hours of operation for each hour that the installation is operating.

The right-party connect rate is approximately 23% or 732 right parties. One second-level call-handling station 20 can handle approximately 20.6 calls per hour. Therefore, utilizing the equation (DIAL*CONNECT*R_CONNECT)/2D_LEV_CALLAVE=2D_LEV_HOURS, the second-level call-handling stations 20 would need 36 man hours of operation for each hour that the installation is operating. Thus the ratio between first- and second-level call-handling stations 16 and 20 is about 42/36. Thus, for the most efficient staffing and operation of the system, there should be 42 staffed or activated first-level call handling stations 16 for every 36 second-level call-handling stations 20.

EXAMPLE 2

Suppose the equations and ratios set forth above are used to determine that 72 second-level call-handling stations 20 are required to be staffed and that the second-level call handlers are divided into two groups. One group handles one type of call that requires an average of 1 minute per call, and the other group handles another type of call that requires an average of 2 minutes per call. The 72 activated and staffed second-level call-handling stations 20 would be allocated so that 24 would handle the first type of call and 48 would handle the second type of call. In one possible embodiment for this example, the each group of second-level call-handling stations 20 is allocated between separate second-level hunt groups or separate sets of second-level hunt groups. In another possible embodiment all of the second-level call-handling stations 20 are connected to the same second-level hunt group.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A system configured to route calls, the system comprising:
   a call routing signal for transferring call information;
   a dialer responsive to the call routing signal;
   first and second hunt groups in electrical communication with the dialer; and
   wherein the dialer first routes the call information to the first hunt group and then to the second hunt group upon receiving the call routing signal.

2. The system of claim 1 further comprising first- and second-level call-handling stations, the first-level call-handling stations being in electrical communication with the first hunt group and the second-level call-handling stations being in electrical communication with the second hunt group, further wherein;
   the call information includes voice information from an outside party;
   the first hunt group electrically connects the voice information to one of the first-level call-handling stations;

the dialer automatically routes the voice information to the second-level hunt group upon receiving the call routing signal; and the second hunt group electrically connects the voice information to one of the second-level call-handling stations.

3. The system of claim 2, wherein the dialer automatically routes the voice information without voice communication between the first-level call-handling stations and the second-level call-handling stations.

4. The system of claim 2, wherein the first-level call-handling stations are located remotely from the dialer and the first and second hunt groups.

5. The system of claim 2, wherein the second-level call-handling stations are located remotely from the dialer and the first and second hunt groups.

6. A method for routing telephone calls between call-handling stations, the method comprising:

placing a telephone call;

routing the telephone call placed by a dialer to first-level call-handling stations upon receiving a call routing signal; and automatically routing the telephone call from the first-level call-handling station to second-level call-handling stations, wherein at least one of the first- or second-level call-handling stations are located at a site remote from the dialer.

7. A method for routing telephone calls between call-handling stations according to claim 6, wherein the telephone call is routed without voice communication between the first and second-level call-handling stations.

8. A method for routing telephone calls between call-handling stations according to claim 6, wherein the telephone call is automatically routed to both the first and second hunt groups.

9. A method for routing telephone calls between call-handling stations according to claim 8, wherein the routing to both the first and second hunt groups further comprises the second hunt group routing the call information to a second call-handling station upon receiving the call routing signal from the first-level call-handling station, wherein the first-level call-handling station will receive a release signal in response to the call information.

10. A method for routing telephone calls between call-handling stations according to claim 6, wherein the routing further comprises differentiating between the first and second hunt group locations.

11. A method for routing telephone calls between call-handling stations according to claim 10, wherein the different locations are connected via a media.

* * * * *